US009529564B2

(12) United States Patent
Lu

(10) Patent No.: US 9,529,564 B2
(45) Date of Patent: Dec. 27, 2016

(54) ASSEMBLING FRAME FOR DISPLAY UNIT AND DISPLAY APPARATUS

(71) Applicants: BOE Technology Group Co., Ltd., Beijing (CN); Beijing BOE Special Display Technology Co., Ltd., Beijing (CN)

(72) Inventor: Ping Lu, Beijing (CN)

(73) Assignees: BOE Technology Group Co., Ltd., Beijing (CN); Beijing BOE Special Display Technology Co., Ltd., Beijing (CN)

( * ) Notice: Subject to any disclaimer, the term of this patent is extended or adjusted under 35 U.S.C. 154(b) by 17 days.

(21) Appl. No.: 14/647,160

(22) PCT Filed: Aug. 29, 2014

(86) PCT No.: PCT/CN2014/085504
§ 371 (c)(1),
(2) Date: May 26, 2015

(87) PCT Pub. No.: WO2015/172460
PCT Pub. Date: Nov. 19, 2015

(65) Prior Publication Data
US 2015/0347078 A1    Dec. 3, 2015

(30) Foreign Application Priority Data

May 13, 2014 (CN) ..................... 2014 2 0243950 U

(51) Int. Cl.
*A47B 43/00* (2006.01)
*A47B 47/00* (2006.01)
(Continued)

(52) U.S. Cl.
CPC ............. *G06F 3/1446* (2013.01); *A47B 47/02* (2013.01); *A47B 47/027* (2013.01);
(Continued)

(58) Field of Classification Search
CPC ...... G06F 3/1446; G06F 3/147; G09F 9/3026; F16M 13/02; F16M 11/046; F16M 11/048; F16M 11/12; A47B 47/027; A47B 81/06; A47B 47/028; A47B 87/00; A47B 87/002; A47B 87/005; A47B 87/007; A47B 87/008; A47B 87/02; A47B 87/0207; A47B 7/0276; A47B 87/0284; A47B 87/0292; A47B 87/0276; A47B 97/001; A47B 85/00; A47B 47/02; A47B 47/021; A47B 47/05; A47B 96/066; A47B 96/067
(Continued)

(56) References Cited

U.S. PATENT DOCUMENTS 1,917,764 A  *  7/1933  Howie ................. A47B 47/027
                                                    220/4.01
2,219,975 A  *  10/1940  Bentz ....................... A47B 5/04
                                                    108/152
(Continued)

FOREIGN PATENT DOCUMENTS

CN      201413613 Y      2/2010
CN      201964119 U      9/2011
(Continued)

OTHER PUBLICATIONS

International Search Report and Written Opinion for PCT Application No. PCT/CN2014/085504, dated Feb. 9, 2015, 10 pages.
(Continued)

*Primary Examiner* — Jennifer E Novosad
(74) *Attorney, Agent, or Firm* — Westman, Champlin & Koehler, P.A.

(57) ABSTRACT

An assembling frame for display units and a display apparatus are provided. The assembling frame comprises: two rectangular side frames disposed opposite to each other in a
(Continued)

longitudinal direction, each of top cross beams and bottom cross beams of the two rectangular side frames being provided with at least one first fitting hole extending in a height direction, and each of front side cross beams and rear side cross beams of the two rectangular side frames being provided with at least one second fitting hole extending in the longitudinal direction; at least one front side cross beam connected between two front side vertical posts of the two rectangular side frames; at least one rear side cross beam connected between two rear side vertical posts of the two rectangular side frames; and at least one hanging member mounted to at least one of the front side cross beams for detachably connecting to a back side of the display units. A display apparatus that is arbitrarily extendable in the transverse and/or the longitudinal directions can be formed by using such an assembling frame, and thereby flexibility of application of the display apparatus is improved.

13 Claims, 2 Drawing Sheets

(51) Int. Cl.
  A47B 57/00      (2006.01)
  G06F 3/14       (2006.01)
  G06F 3/147      (2006.01)
  A47B 47/02      (2006.01)
  A47B 87/00      (2006.01)
  A47B 85/00      (2006.01)
  A47B 87/02      (2006.01)
  A47B 81/06      (2006.01)
  F16M 11/04      (2006.01)
  F16M 11/12      (2006.01)
  F16M 13/02      (2006.01)
  G09F 9/302      (2006.01)
(52) U.S. Cl.
  CPC .......... *A47B 47/028* (2013.01); *A47B 81/06* (2013.01); *A47B 85/00* (2013.01); *A47B 87/007* (2013.01); *A47B 87/008* (2013.01); *A47B 87/0284* (2013.01); *F16M 11/046* (2013.01); *F16M 11/048* (2013.01); *F16M 11/12* (2013.01); *F16M 13/02* (2013.01); *G06F 3/147* (2013.01); *G09F 9/3026* (2013.01)
(58) Field of Classification Search
  USPC ............... 211/27, 189, 186, 26, 188, 194, 191,211/87.01, 90.01; 312/257.1, 265.1–265.6
  See application file for complete search history.

(56) References Cited

U.S. PATENT DOCUMENTS

| | | | | |
|---|---|---|---|---|
| 2,958,425 A | * | 11/1960 | Best | A47B 47/027 211/182 |
| 3,027,013 A | * | 3/1962 | Taiz | G07D 9/02 211/45 |
| 3,045,834 A | * | 7/1962 | Seiz | A47B 47/027 211/182 |
| 3,897,876 A | * | 8/1975 | Feldman | A47F 7/30 211/182 |
| 3,912,087 A | * | 10/1975 | Zeischegg | A47B 87/007 211/182 |
| 3,976,014 A | * | 8/1976 | Brown | A47B 47/021 108/143 |
| 3,982,638 A | * | 9/1976 | Lamson | B65G 1/02 108/55.1 |
| 4,034,682 A | * | 7/1977 | Bizinover | A47B 47/05 108/107 |
| 4,416,380 A | * | 11/1983 | Flum | A47F 1/121 211/181.1 |
| 5,014,487 A | * | 5/1991 | King | A47B 47/027 211/191 |
| 5,016,765 A | * | 5/1991 | Leonardo | A47B 47/021 211/182 |
| 5,692,625 A | * | 12/1997 | Filipescu | A47B 43/00 211/194 |
| 5,711,435 A | * | 1/1998 | Morison | A47F 7/0028 211/90.01 |
| 5,749,481 A | * | 5/1998 | Miller | A47B 96/1441 211/187 |
| 6,102,219 A | * | 8/2000 | Wang | A47B 87/00 211/194 |
| 6,223,914 B1 | * | 5/2001 | Snell | A47G 25/06 211/117 |
| 6,315,136 B1 | * | 11/2001 | Baldoni | A47B 47/027 211/189 |
| 6,688,712 B2 | * | 2/2004 | Adams | E04B 1/3483 211/191 |
| 7,997,213 B1 | * | 8/2011 | Gauthier | B65D 88/022 108/53.1 |
| 8,919,363 B1 | * | 12/2014 | Johnson | A47F 7/0035 135/128 |
| 2004/0040923 A1 | * | 3/2004 | Wolff | A47F 5/10 211/194 |
| 2007/0145864 A1 | * | 6/2007 | Freedman | A47B 87/007 312/107 |
| 2007/0170136 A1 | * | 7/2007 | Kenny | A47B 77/02 211/182 |
| 2007/0227994 A1 | * | 10/2007 | Cho | A47B 47/005 211/188 |
| 2011/0036798 A1 | * | 2/2011 | Chen | A47B 47/0008 211/188 |
| 2014/0124468 A1 | * | 5/2014 | Lundrigan | A47B 87/0284 211/182 |
| 2015/0347078 A1 | * | 12/2015 | Lu | G09F 9/3026 345/1.3 |
| 2016/0166082 A1 | * | 6/2016 | Nguyen | A47D 11/00 297/129 |

FOREIGN PATENT DOCUMENTS

| | | |
|---|---|---|
| CN | 202132664 U | 2/2012 |
| CN | 102788236 A | 11/2012 |
| CN | 103162068 A | 6/2013 |
| CN | 203189971 U | 9/2013 |

OTHER PUBLICATIONS

English translation of Box No. V of the Written Opinion for PCT Application No. PCT/CN2014/085504, 2 pages.

* cited by examiner

ASSEMBLING FRAME FOR DISPLAY UNIT AND DISPLAY APPARATUS

CROSS-REFERENCE TO RELATED APPLICATION

This Application is a Section 371 National Stage Application of International Application No. PCT/CN2014/085504, filed 29 Aug. 2014, which has not yet published, and claims priority to Chinese Patent Application No. 201420243950.2, filed on 13 May 2014, in Chinese, the contents of which are hereby incorporated by reference in their entirety.

BACKGROUND OF THE INVENTION

Field of the Invention

Embodiments of the present invention relates to an assembling frame for a display unit and a display apparatus including the assembling frame, and especially, to an assembling frame for a display unit of a video wall and the video wall.

Description of the Related Art

With continuous development of display technologies, large scale display devices have been widely used in fields of military affairs, public securities, railways, airlines, finance, and negotiable securities. A video wall is a computer-based displaying, broadcasting, and controlling system, which comprises a plurality of display units. A user can select a display mode of a video wall. For example, the user can select a screen-group display mode, or a full-screen display mode, or a user-defined trans-screen display mode.

Recently, a video wall mainly comprises a cabinet type and a ground-supporting type. In a video wall of the cabinet type, each display unit is secured on a cabinet through a screw. In a video wall of the ground-supporting type, a ground support is formed by connecting angled components, and display units are hung from a cross beam of the ground support.

In the above video walls, the number of display units included in the video wall is fixed, and the video wall cannot be extended as desired. Furthermore, assembling and disassembling of the video wall is difficult.

SUMMARY OF THE INVENTION

Embodiments of the present invention provide an assembling frame for a display unit and a display apparatus including the assembling frame, so as to simplify the process of assembling and disassembling the display apparatus such as a video wall and to render the display apparatus with extendibility.

According to an aspect of the present invention, there is provided an assembling frame for a display unit, comprising: two rectangular side frames disposed opposite to each other in a longitudinal direction, each of the rectangular side frame including a top cross beam, a bottom cross beam, a front side vertical post and a rear side vertical post; each of the top cross beam and the bottom cross beam of each rectangular side frame being provided with at least one first fitting hole extending in a height direction, and each of the front side vertical post and the rear side vertical post of each rectangular side frame being provided with at least one second fitting hole extending in a longitudinal direction; at least one front side cross beam connected between the two front side vertical posts of the two rectangular side frames; at least one rear side cross beam connected between the two rear side vertical posts of the two rectangular side frames; and at least one hanging member mounted to at least one front side cross beam for detachably connecting to a back side of the display unit.

In the above assembling frame, two front side cross beams are disposed close to the top cross beams and the bottom cross beams of the rectangular side frames respectively, and two rear side cross beams are disposed close to the top cross beams and the bottom cross beams of the rectangular side frames respectively.

In the above assembling frame, the front side cross beam and the rear side cross beam are welded or detachably connected between the two rectangular side frames respectively.

In the above assembling frame, the first fitting holes disposed respectively in the top cross beam and the bottom cross beam of each rectangular side frame align with each other in pair in the height direction, and the second fitting holes disposed respectively in the front side cross beams or the rear side cross beams of two rectangular side frames align with each other in pair in the longitudinal direction.

According to an aspect of the present invention, there is provided a display apparatus, comprising: a plurality of assembling frames according to any one of the embodiments, the assembling frames being assembled into an array; a plurality of fasteners, two adjacent assembling frames in the height direction being connected by a fastener fitted with the first fitting hole, and two adjacent assembling frames in the longitudinal direction being connected by a fastener fitted with the second fitting hole; and at least one row of display units, a back side of each display unit being hung from the front side cross beam of a corresponding assembling frame by the hanging member.

In the above display apparatus, the hanging member comprises a connecting portion connected to the back side of the display unit, a horizontal hanging portion and a vertical hanging portion connected to the front side cross beam.

In the above display apparatus, the horizontal hanging portion and the vertical hanging portion are provided with fine adjustment screws, respectively.

In the above display apparatus, each front side cross beam having a hanging function supports a corresponding display unit through at least two hanging members.

In the above display apparatus, the fastener comprises a bolt and a nut.

The display apparatus may be a video wall.

In the assembling frame and the display apparatus according to the embodiments of the invention, a plurality of assembling frames can be connected in the height direction by engaging the first fitting holes with the fasteners, and a plurality of assembling frames can be connected in the longitudinal direction by engaging the second fitting holes and the fasteners, such that a display apparatus that is arbitrarily extendable in the vertical and/or the longitudinal directions can be formed, and the flexibility of application of the display apparatus is thereby improved.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

In order to make the object, the technical solution and the advantages of the present invention more clear, the present invention will be described in detail hereinafter with reference to the attached drawings. Of course, the described embodiments are not all but some of the embodiments of the present invention. All embodiments that can be obtained by those skilled in the art based on the embodiments described herein without paying an inventive work should fall within the scope of the invention.

In addition, in the following description, many details are described to provide a throughout understanding of the disclosed embodiments. Obviously, one or more embodiments can be implemented without these specific details. In other circumstances, well-known structures and devices are schematically illustrated for simplifying the drawings.

According to the present invention, there is provided an assembling frame for a display unit comprising: two rectangular side frames disposed opposite to each other in a longitudinal direction, each rectangular side frame comprising a top cross beam, a bottom cross beam, a front side vertical post, and a rear side vertical post, each of the top cross beam and the bottom cross beam of each rectangular side frame being provided with at least one first fitting hole extending in a height direction, and each of front side vertical post and the rear side vertical post of each rectangular side frame being provided with at least one second fitting hole extending in the longitudinal direction; at least one front side cross beam connected between two front side vertical posts of the two rectangular side frames; at least one rear side cross beam connected between two rear side vertical posts of the two rectangular side frames; and at least one hanging member mounted to at least one front side cross beam for detachably connecting to a back side of the display unit.

For easy understanding, in the following description, the display apparatus of the present application will be described by taking a video wall as an example. However, a person skilled in the art would appreciate that the display apparatus according to the concept of the present invention may be any display apparatus including at least one display unit and can be extendible by increasing the number of the display units.

In the following description, in a properly operating state of a video wall according to embodiments of the present invention, a "front side" indicates a side of a video wall facing a user, and a "rear side" indicates a side of a video wall opposite to the front side, a longitudinal direction indicates a left-right direction relative to the user, and a height direction indicates a up-down direction relative to the user.

Figure 1:
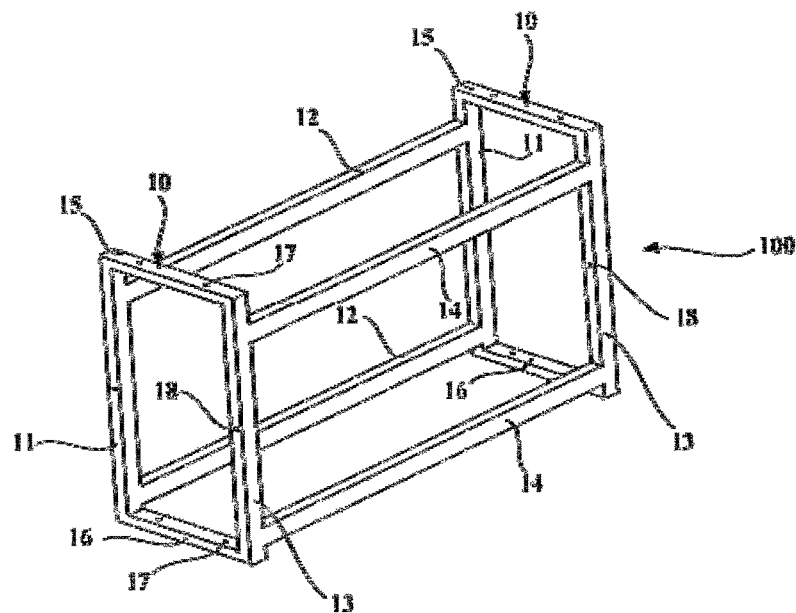
FIG. 1 is an illustrative perspective view of an assembling frame according to an exemplary embodiment of the present invention.
Figure 2:
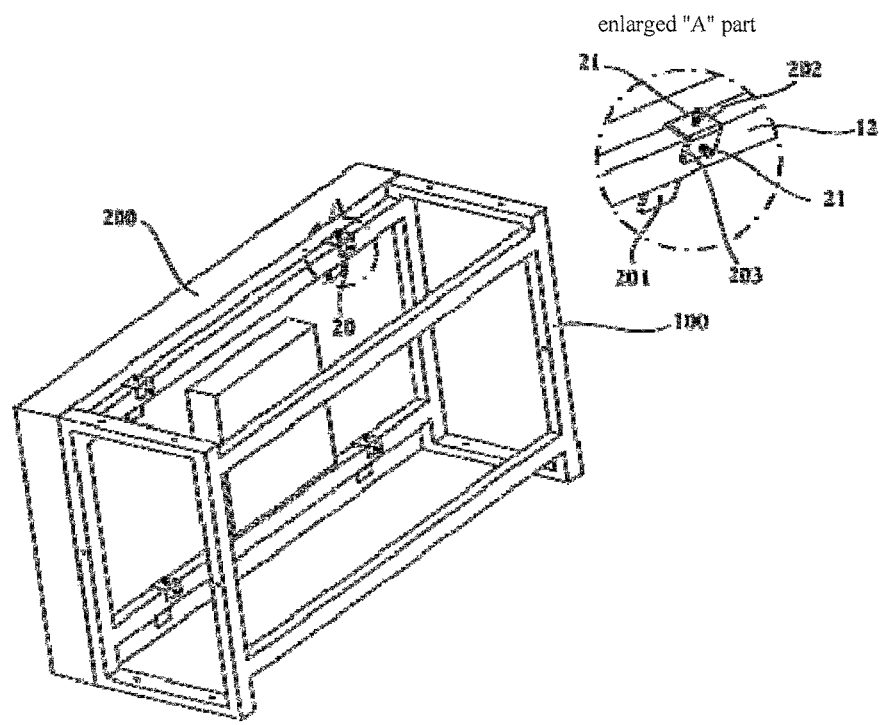
FIG. 2 is an illustrative perspective view of the assembling frame shown in FIG. 1 with a display unit mounted thereto.

As shown in FIGS. 1 and 2, an assembling frame 100 for a display unit of a video wall according to an exemplary embodiment of the present invention comprises: two rectangular side frames 10 disposed opposite to each other in the longitudinal direction, at least one front side cross beam 12 connected between two front side vertical posts 11 of the two rectangular side frames 10, at least one rear side cross beam 14 connected between two rear side vertical posts 13 of the two rectangular side frames 10, and at least one hanging member. Each of top cross beams 15 and bottom cross beams 16 of the two rectangular side frames 10 is provided with at least one first fitting hole 17 extending in the height direction, and each of the front side cross beams 11 and the rear side cross beams 13 of the two rectangular side frames 10 is provided with at least one second fitting hole 18 extending in the longitudinal direction. Hanging members 20 are mounted to at least one of the front side cross beams 12 for detachably connecting to a rear side of a display unit 200.

In one exemplary embodiment, the first fitting holes 17 disposed respectively in the top cross beam 15 and the bottom cross beam 16 align with each other in pair in the height direction, so as to facilitate connecting two assembling frames 100 in the height direction; furthermore, the second fitting holes 18 disposed respectively in the front side cross beams 11 or the rear side cross beams 13 align with each other in pair in the longitudinal direction, so as to facilitate connecting two assembling frames 100 in the longitudinal direction.

In the embodiments of the present invention, the type of the display unit 200 could be, for example, a liquid crystal display (LCD) screen, or an organic light-emitting diode (OLED), which is not specifically limited herein. In order to reduce the seams between the display units of the video wall to be formed, the shape of the assembling frame 100 should substantially match the shape of the display unit 200, and in such a manner, when a user watches the video wall from the front side of the video wall, not only the assembling frame 100 cannot be seen, but also the seams between the display units 200 are minimized, so that a better display performance can be achieved.

The numbers of the front side cross beams 12 and the rear side cross beams 14 are not specifically limited herein. With reference to FIGS. 1 and 2, there are two front side cross beams 12 disposed close to the top cross beams 15 and the bottom cross beams 16 of the rectangular side frames 10, respectively; there are two rear side cross beams 14 disposed close to the top cross beams 15 and the bottom cross beams 16 of the rectangular side frames 10, respectively. With such a design, the assembling frame 100 can be made stable and solid and in turn a structure of the video wall can be made stable and solid. The display unit 200 is hung from a front side cross beam 12, a top of the display unit is flush with the top cross beams 15 of the rectangular frames 10, sides of the display unit are flush with the front side vertical posts 11, and the seams between adjacent display units 200 are minimized.

Optionally, the front side cross beam 12 and the rear side cross beam 14 are welded or detachably connected between the two rectangular side frames 10, respectively. The assembling frame 100 may be made, for example, from aluminum section material. The assembling frame 100 made from aluminum section material can significantly decrease an entire weight of a video wall, such that assembling, disassembling, and moving of the video wall are facilitated.

In an exemplary embodiment, a fastener 19 comprises a bolt and a nut, so that it is easy to mount and detach the fastener, and it has a good exchangeability. With the assembling frame 100 according the embodiment of the invention, two adjacent assembling frames 100 in the height direction may be fixedly connected by a fastener 19 fitted with the first fitting hole 17 at a connection position, and two adjacent assembling frames 100 in the longitudinal direction may be connected by a fastener 19 fitted with the second fitting hole 18 at a connection position, so as to form a video wall that is arbitrarily extendable in the transverse and/or the longitudinal directions, and thereby the flexibility of application of the video wall is improved. In addition, adjacent assembling frames 100 are connected by fasteners 19, display units 200 are hung from the front side cross beams 12 of the assembling frames 100, such that assembling and disassembling of the video wall are very easy.

Figure 3:
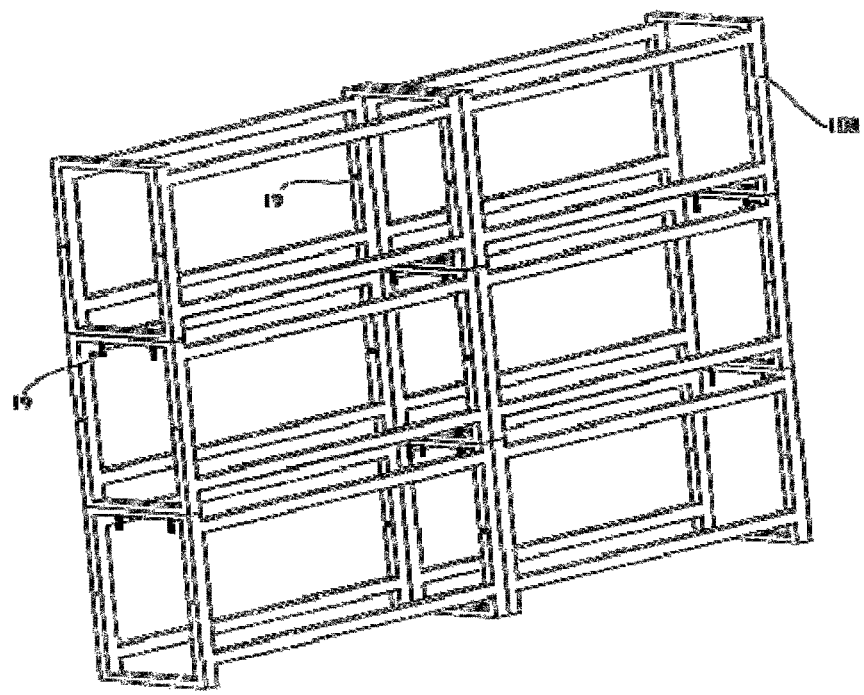
FIG. 3 is an illustrative perspective view showing that 2*3 assembling frames are assembled together.
Figure 4:
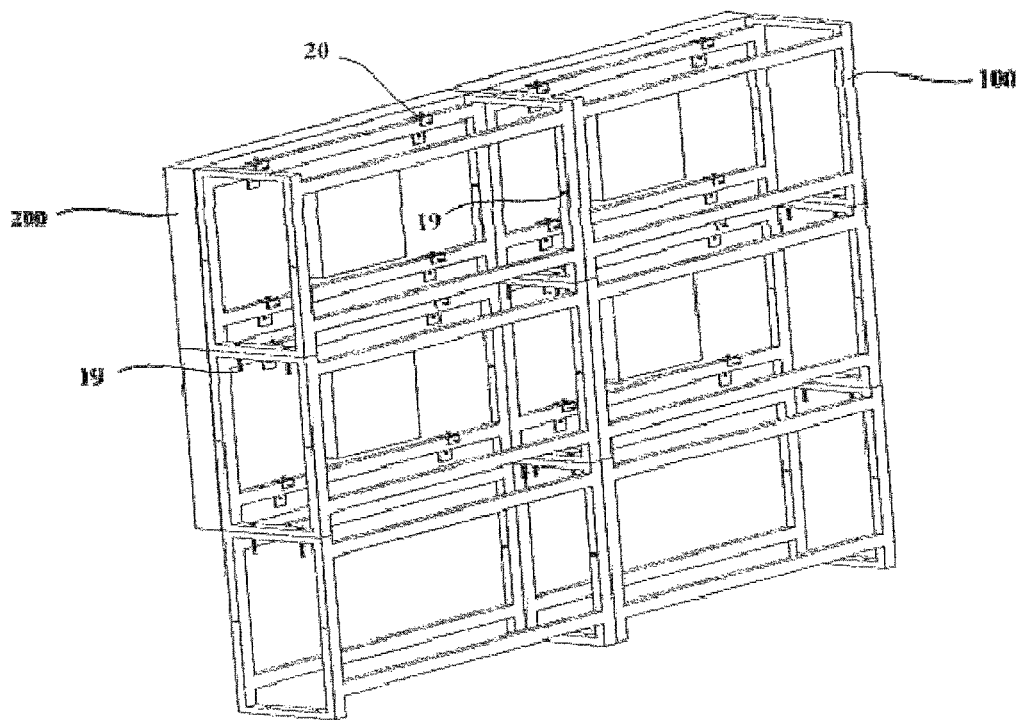
FIG. 4 is an illustrative perspective view of a video wall according to an exemplary embodiment of the present invention.

As shown in FIGS. 3 and 4, according to a further embodiment of the invention, there is provided a video wall, which comprises: a plurality of assembling frames 100 according to above mentioned embodiments arranged in an array, a plurality of fasteners 19, and at least one row of display units 200, a back side of each display unit 200 is hung from a front side cross beam 12 of a corresponding assembling frame 100 by a hanging member 20 (as shown in FIGS. 1 and 2). Two adjacent assembling frames 100 in the height direction are connected by a fastener 19 fitted with the first fitting hole 17, and two adjacent assembling frames 100 in the longitudinal direction are connected by a fastener 19 fitted with the second fitting hole 18.

As shown in FIG. 4, the lowermost one or more row(s) of the assembling frames 100 (the number of the rows is not specifically limited and can be selected based on a height of the screen of the video wall) may also be used as a supporting base without any display unit being mounted thereto. The video wall can be extended arbitrarily in the transverse direction (vertical direction) and/or the longitudinal direction, a flexibility of application of the video is thereby improved. In addition, adjacent assembling frames 100 are connected by fasteners 19, display units 200 are hung from the front side cross beams 12 of the assembling frames 100, such that assembling and disassembling of the video wall are very easy.

Please refer to FIG. 2, in an exemplary embodiment, the hanging member 20 comprises a connecting portion 201 connected to the back side of the display unit 200, and a horizontal hanging portion 202 and a vertical hanging portion 203 connected to the front side cross beam 12. With a hanging member having such a structure, the display unit 200 can be securely hung from the assembling frame 100 and cannot be detached easily. Furthermore, each front side cross beam 12 having a hanging function supports a corresponding display unit 200 through at least two hanging members 20, such that the display unit 200 can be more stably and securely hung from the assembling frame 100.

The horizontal hanging portion 202 and the vertical hanging portion 203 are provided with fine adjustment screws 21, respectively. Through adjusting an amount of rotation of the fine adjustment screw 21, the positions of the display unit 200 in the height direction and in the front-rear direction (transversal direction) can be adjusted. The display unit 200 can also be moved leftward or rightward to adjust its longitudinal position. The video wall is easy to be adjusted freely with high precision, so that it has a better display performance.

Taking a video wall having display units arranged in a 2*2 array as an example, when assembling the assembling frames 100, two adjacent assembling frames 100 in the height direction are connected by a bolt and a nut fitted with the first fitting hole 17 at a connection position, and two adjacent assembling frames 100 in the longitudinal direction are connected by a bolt and nut fitted with the second fitting hole 18 at a connection position. There are 2*3 assembling frames, as shown in FIG. 3. Two assembling frames 10 at the bottom are used as a supporting base for supporting four assembling frames 100 above the supporting base, the four assembling frames 100 are used to mount LCD screens. The LCD screens are hung from the front side beams 12 of corresponding assembling frames 100 by hanging members 20 at the back side of the LCD screens, as shown in FIG. 4. If the video wall needs to be extended in the vertical and/or the longitudinal direction, a user only needs to assemble additional assembling frames and mount corresponding LCD screens. When the video wall needs to be detached, a user only needs to remove the LCD screens, dismount corresponding bolts and nuts, so as to separate the adjacent assembling frames, so that the detachment of the video wall is very easy.

Obviously, various changes or modifications can be made by those skilled in the art without departing from the principles and spirit of the disclosure. If those changes and modifications fall into the scope of the claims and their equivalents, then the present invention is intended to include such changes and modifications.

What is claimed is:

1. A display apparatus, comprising:
   a plurality of assembling frames, the assembling frames being arranged into an array;
   each of the plurality of assembling frames comprising:
      two rectangular side frames disposed opposite to each other in a longitudinal direction, wherein each rectangular side frame includes a top cross beam, a bottom cross beam, a front side vertical post, and a rear side vertical post, each of the top cross beam and the bottom cross beam of each rectangular side frame being provided with at least one first fitting hole extending in a height direction, and each of the front side vertical post and the rear side vertical post of each rectangular side frame being provided with at least one second fitting hole extending in the longitudinal direction;
      at least one front side cross beam connected between two front side vertical posts of the two rectangular side frames;
      at least one rear side cross beam connected between two rear side vertical posts of the two rectangular side frames; and
      at least one hanging member mounted to at least one of the front side cross beams for detachably connecting to a back side of the display unit; and
   a plurality of fasteners, two adjacent assembling frames in the height direction being connected by a fastener fitted with the first fitting hole, and two adjacent assembling frames in the longitudinal direction being connected by a fastener fitted with the second fitting hole; and
   at least one row of display units, a back side of each display unit being hung from the front side cross beam of a corresponding assembling frame by the hanging member.

2. The display apparatus according to claim 1, wherein the hanging member comprises a connecting portion connected to the back side of the display unit, a horizontal hanging portion and a vertical hanging portion connected to the front side cross beam.

3. The display apparatus according to claim 2, wherein the horizontal hanging portion and the vertical hanging portion are provided with fine adjustment screws, respectively.

4. The display apparatus according to claim 1, wherein each front side cross beam adapted to support a corresponding display unit through at least two hanging members.

5. The display apparatus according to claim 3, wherein each of the plurality of fasteners comprises a bolt and a nut.

6. The display apparatus according to claim 2, wherein each front side cross beam adapted to support a corresponding display unit through at least two hanging members.

7. The display apparatus according to claim 2, wherein each of the plurality of fasteners comprises a bolt and a nut.

8. The display apparatus according to claim 1, wherein each front side cross beam adapted to support a corresponding display unit through at least two hanging members.

9. The display apparatus according to claim 1, wherein each of the plurality of fasteners comprises a bolt and a nut.

10. The display apparatus according to claim 1, wherein the at least one front side cross beam comprises two front side cross beams disposed adjacent to the top cross beams and the bottom cross beams of the rectangular side frames respectively, and the at least one rear side cross beam comprises two rear side cross beams disposed adjacent to the top cross beams and the bottom cross beams of the rectangular side frames respectively.

11. The display apparatus according to claim 1, wherein the front side cross beam and the rear side cross beam are welded or detachably connected between the two rectangular side frames respectively.

12. The display apparatus according to claim 1, wherein the first fitting holes disposed respectively in the top cross beam and the bottom cross beam of each rectangular side frame align with each other in pair in the height direction, and the second fitting holes disposed respectively in the front side cross beams or the rear side cross beams of the two rectangular side frames align with each other in pair in the longitudinal direction.

13. The display apparatus according to claim 1, wherein the display apparatus comprises a video wall.

\* \* \* \* \*